United States Patent [19]

Bonometti et al.

[11] Patent Number: 4,843,148
[45] Date of Patent: * Jun. 27, 1989

[54] PROCESS FOR THE PREPARATION OF FLUOROTRIAZINE USING ALKALI METAL FLUORIDE SALTS

[75] Inventors: Emil Bonometti, Basel; Herbert Seiler, Riehen, both of Switzerland

[73] Assignee: Ciba-Geigy Corporation, Ardsley, N.Y.

[*] Notice: The portion of the term of this patent subsequent to Apr. 26, 2005 has been disclaimed.

[21] Appl. No.: 945,731

[22] Filed: Dec. 23, 1986

[30] Foreign Application Priority Data

Dec. 24, 1985 [CH] Switzerland .................... 5527/85

[51] Int. Cl.$^4$ .................... C09B 43/00; C09B 50/00; C09B 62/038; C09B 62/018
[52] U.S. Cl. .................... 534/598; 534/618; 534/632; 534/634; 534/635; 534/636; 534/637; 534/638
[58] Field of Search ............. 534/598, 618, 622–627, 534/632–638; 544/194, 196, 211, 204

[56] References Cited

U.S. PATENT DOCUMENTS

| | | | |
|---|---|---|---|
| 4,189,576 | 2/1980 | Altorfer et al. | 544/211 |
| 4,242,259 | 12/1980 | Harms et al. | 534/598 X |
| 4,261,889 | 4/1981 | Seiler et al. | 534/598 X |
| 4,329,282 | 5/1982 | Henk | 534/598 X |
| 4,446,067 | 5/1984 | Jager et al. | 534/598 X |
| 4,447,357 | 5/1984 | Holzle et al. | 534/598 X |
| 4,474,697 | 10/1984 | Wunderlich et al. | 534/598 X |
| 4,614,818 | 9/1986 | Deitz et al. | 534/598 |
| 4,649,193 | 3/1987 | Meininger et al. | 534/598 X |
| 4,740,597 | 4/1988 | Franke et al. | 544/211 |

FOREIGN PATENT DOCUMENTS 0172790  2/1986  European Pat. Off. ............ 544/211

OTHER PUBLICATIONS

Franke et al., Chemical Abstracts, vol. 105, #228492j (1986).
Hawley's Condensed Chemical Dictionary 7th ed. (1987) p. 893.

Primary Examiner—Floyd D. Higel
Attorney, Agent, or Firm—Edward McC. Roberts; Meredith C. Findlay

[57] ABSTRACT

A process for the preparation of reactive dyes of the formula

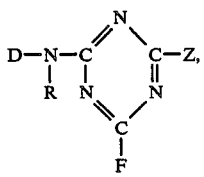
(1)

in which D, R and Z are as defined in greater detail in the description, which comprises subjecting 2,4,6-trifluoro-s-triazine to a condensation reaction in a strongly acid solution and in the presence of an alkali metal fluoride with an amine of the formula

H—Z   (3)

and then subjecting the primary condensation product obtained to a condensation reaction with an amino dye of the formula

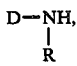
(2)

affords reactive dyes of the formula (1) in a high yield and a high state of purity.

7 Claims, No Drawings

PROCESS FOR THE PREPARATION OF FLUOROTRIAZINE USING ALKALI METAL FLUORIDE SALTS

The monoacylation of water-soluble organic amino compounds, using 2,4,6-trifluoro-s-triazine (cyanuric fluoride), by customary processes, the semi-continuous mode of reaction, i.e. in such a way that an amino compound dissolved in aqueous solution is initially taken and cyanuric fluoride is metered in at a specific rate, frequently proceeds in a non-uniform manner, since, owing to the high reactivity of the monocondensation products of cyanuric fluoride which are primarily formed, the latter immediately react further with the non-acylated amino compound still present to give water-soluble dicondensation products. In particular, water-soluble organic amino compounds which react smoothly and rapidly with cyanuric fluoride can therefore not be condensed with cyanuric fluoride in a uniform manner.

The consequence of the state of affairs described above is that, when reactive dyes of the formula (1) indicated later in the text are prepared, byproducts are frequently formed, which results in a reduced yield and, additionally, in poorer washing-off properties in the unfixed portions of dye.

It has now been found that the disadvantage of the formation of a dicondensation product can be avoided if the condensation reactions are carried out in a strongly acid solution in the presence of alkali metal fluorides.

The invention therefore relates to a process for the preparation of reactive dyes of the formula

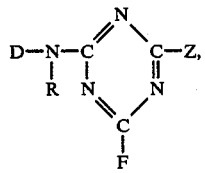

in which D is a monoazo or polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide dye containing sulfo groups, R is hydrogen or substituted or unsubstituted $C_1$-$C_4$-alkyl, and Z is a substituted or unsubstituted amino group, by subjecting 2,4,6-trifluoro-s-triazine to a condensation reaction with an amino dye of the formula

and an amine of the formula

H—Z  (3), which comprises subjecting 2,4,6-trifluoro-s-triazine to a condensation reaction with an amine of the formula (3) in a strongly acid solution and in the presence of an alkali metal fluoride, and then subjecting the resulting primary condensation product of the formula

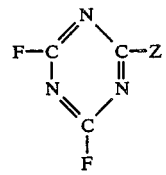

to a condensation reaction with an amino dye of the formula (2) to give a reactive dye of the formula (1).

The process is preferably carried out (a) by adding 2,4,6-trifluoro-s-triazine at a low temperature to a mixture consisting of an amine of the formula

H—Z  (3), an alkali metal fluoride and a solvent, introducing the resulting reaction mixture into a solution of a dye of the formula

and, after the completion of the reaction, isolating the resulting reactive dye of the formula (1).

A further embodiment consists in (b) reacting 2,4,6-trifluoro-s-triazine, in the presence of an alkali metal fluoride, simultaneously with an amino dye of the formula (2) and an amine of the formula (3) to give a reactive dye of the formula (1).

The procedure followed in this process variant is preferably to add 2,4,6-trifluoro-s-triazine at a low temperature to a mixture consisting of an amine of the formula (3), an alkali metal fluoride, a dye of the formula (2) and a solvent, and to isolate the resulting reactive dye of the formula (1).

In both process variants it is preferable to use aqueous mixtures or solutions. In variant (a) the first reaction stage is preferably carried out at 0° to 5° C. In variant (b) the single-stage reaction is also preferably carried out at 0° to 5° C.

Examples of suitable alkali metal fluorides are lithium fluoride, sodium fluoride and potassium fluoride. It is preferable to use sodium fluoride, NaF.

If the radical R is an alkyl radical, it is linear or branched; it can contain further substituents, for example halogen, hydroxyl, cyano, $C_{1-4}$-alkoxy, carboxyl or sulfo. The following radicals may be mentioned as examples of R: methyl, ethyl, propyl, isopropyl, butyl, isobutyl, sec.-butyl, tert.-butyl, carboxymethyl, β-carboxyethyl, β-carboxypropyl, methoxycarbonylmethyl, ethoxycarbonylmethyl, β-methoxyethyl, β-ethoxyethyl, β-methoxypropyl, β-chloroethyl β-bromopropyl, β-hydroxyethyl, β-hydroxybutyl, β-cyanoethyl, sulfomethyl, β-sulfoethyl, aminosulfonylmethyl and β-sulfatoethyl. R is preferably hydrogen, methyl or ethyl.

The following are suitable unsubstituted or substituted amino groups Z in the fluoro-s-triazinyl radicals: —NH$_2$, alkylamino, N,N-dialkylamino, cycloalkylamino, N,N-dicycloalkylamino, aralkylamino or arylamino groups, amino groups containing mixed substituents, such as N-alkyl-N-cyclohexylamino and N-alkyl-N-arylamino groups, and also amino groups containing heterocyclic radicals which can contain further fused carbocyclic rings, and also amino groups in which the amino nitrogen atom is a member of an N-heterocyclic ring which can contain further hetero atoms. The alkyl radicals mentioned above can be linear or branched or low-molecular or high-molecular; alkyl radicals having 1 to 6 carbon atoms are preferred; suitable cycloalkyl, aralkyl and aryl radicals are, in particular, cyclohexyl, benzyl, phenethyl, phenyl and naphthyl radicals; heterocyclic radical are especially furan, thiophene, pyrazole, pyridine, pyrimidine, quinoline, benzimidazole, benzthiazole and benzoxazole radicals; and suitable amino groups in which the amino nitrogen atom is a member of an N-heterocyclic ring are preferably radicals of six-membered N-heterocyclic compounds which can contain nitrogen, oxygen or sulfur as further hetero atoms. The alkyl, cycloalkyl, aralkyl and aryl radicals mentioned above, the heterocyclic radicals and the N-heterocyclic rings can contain further substituents, for example: halogen, such as fluorine, chlorine and bromine, nitro, cyano, trifluoromethyl, sulfamoyl, carbamoyl, $C_{1-4}$-alkyl, $C_{1-4}$-alkoxy, acylamino groups, such as acetylamino or benzoylamino, ureido, hydroxyl, carboxyl, sulfomethyl, sulfato or sulfo. The following may be mentioned as examples of amino groups of this type: $NH_2$, methylamino, ethylamino, propylamino, isopropylamino, butylamino, hexylamino, β-methoxyethylamino, γ-methoxypropylamino, β-ethoxyethylamino, N,N-dimethylamino, N,N-diethylamino, β-chloroethylamino, β-cyanoethylamino, γ-cyanopropylamino, β-carboxyethylamino, sulfomethylamino, β-sulfoethylamino, β-hydroxyethylamino, N,N-di-β-hydroxyethylamino, γ-hydroxypropylamino, benzylamino, phenethylamino, cyclohexylamino, phenylamino, toluidino, xylidino, chloroanilino, anisidino, phenetidino, N-methyl-N-phenylamino, N-ethyl-N-phenylamino, N-β-hydroxyethyl-N-phenylamino, 2-, 3- or 4-sulfoanilino, 2,5-disulfoanilino, 4-sulfomethylanilino, N-sulfomethylanilino, 2-, 3- or 4-carboxypenylamino, 2-carboxy-5-sulfophenylamino, 2-carboxy-4-sulfophenylamino, 3-sulfatoethylsulfonylphenylamino, 4-sulfatoethylsulfonylphenylamino, 3-vinylsulfonylphenylamino, 4-vinylsulfonylphenylamino, 4-sulfonaphth-1-ylamino, 3,6-disulfonaphth-1-ylamino, 3,6,8-trisulfonaphth-1-ylamino, 4,6,8-trisulfonaphth-1-ylamino, 1-sulfonaphth-2-ylamino, 1,5-disulfonaphth-2-ylamino, 6-sulfonaphth-2-ylamino, morpholino, piperidino and piperazino.

Suitable amines of the formula (3) are, in particular, unsubstituted or substituted aminobenzenes, for example 1-aminobenzene-2-sulfonic acid, 1-aminobenzene-3-sulfonic acid, 1-aminobenzene-4-sulfonic acid, 1-amino-4-methylbenzene-3-sulfonic acid, 1-amino-4-methoxybenzene-3-sulfonic acid, 1-amino-2-methylbenzene-4-sulfonic acid, 1-amino-3-methylbenzene-4-sulfonic acid, 1-aminobenzene-3,5-disulfonic acid 4-aminobenzoic acid, 2-amino-5-sulfobenzoic acid, 1-amino-3-sulfatoethylsulfonylbenzene, 1-amino-4-sulfatoethylsulfonylbenzene, 1-amino-3-vinylsulfonylbenzene, 1-amino-4-vinylsulfonylbenzene, 1-aminobenzene-2,4-disulfonic acid, 1-aminobenzene-2,5-disulfonic acid, 1-amino-4-methocybenzene-2-sulfonic acid, 1-amino-2-chlorobenzene-4-sulfonic acid, 1-amino-2,5-dimethoxy-4-sulfatoethylsulfonylbenzene, 1-amino-2-methoxy-5-sulfatoeyhlsulfonylbenzene, 1-amino-2,5-dimethoxy-4-vinylsulfonylbenzene and 1-amino-2-methoxy-5-vinylsulfonylbenzene.

Suitable amino dyes of the formula (2) are dyes, containing amino groups, of the classes mentioned under formula (1); these can be substituted in a customary manner, for example by methyl, ethyl, methoxy, ethoxy, acetylamino, benzoylamino, amino, chloro, bromo, ureido, hydroxyl, carboxyl, sulfomethyl or sulfo. The radical D preferably contains one or more sulfonic acid groups.

Suitable dyes containing amino groups are, in particular, those of the formula

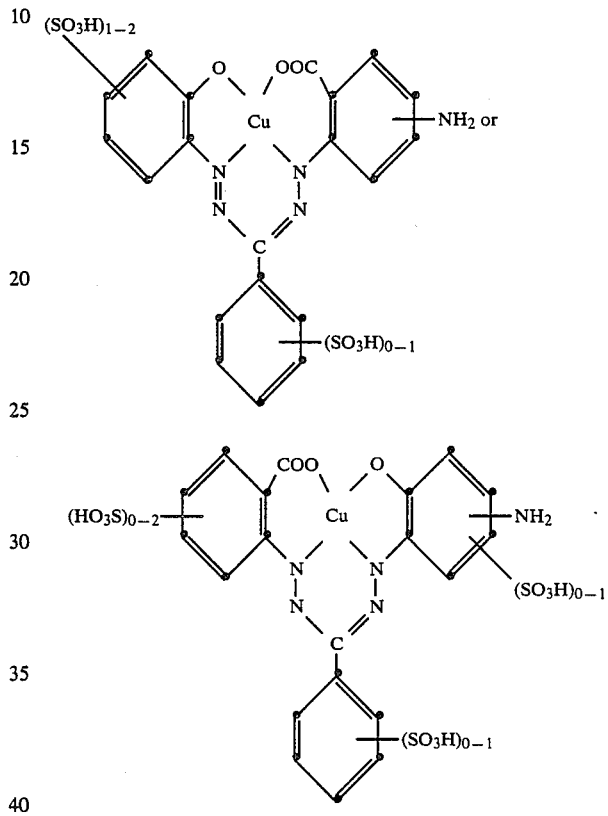

in which the benzene nuclei can be further substituted by alkyl having 1 to 4 C atoms, alkoxy having 1 to 4 C atoms, alkylsulfonyl having 1 to 4 C atoms, halogen or carboxyl.

Instead of using an amino dye of the formula (2), it is also possible to use as starting material a precursor of a dye, for example a diazo or coupling component, and to complete the dye after the condensation reactions.

The process according to the invention affords reactive dyes of the formula (1) in a high yield and a high state of purity. The reactive dyes of the formula (1) are particularly suitable for dyeing cotton from an aqueous dye bath by known processes.

In the examples below, unless otherwise indicated, the parts are parts by weight and the temperatures are quoted in degrees Celsius.

EXAMPLE 1

140 g of 1-aminobenzene-3-sulfonic acid are dissolved in concentrated sodium hydroxide solution to give a neutral solution. 70 g of sodium fluoride are then added, and the reaction mixture is cooled to 0° C. by adding ice, and 120 ml of concentrated hydrochloric acid are run in. 110 g of 2,4,6-trifluoro-1,3,5-triazine are run in at 0° C., with very good stirring, in the course of 2 minutes, and stirring is then continued for a further 5 minutes. The condensation product thus obtained is added, in the course of 30 minutes, at 20° to 25° C., and at a pH of 7.5 to 8 to a neutral solution of 388 g of the Cu complex of N-(2-carboxy-5-sulfophenyl)-N'-(2'-hydroxy-3'-amino-5'-sulfophenyl)-ms-phenylformazan. After the reaction has ended, the the dye of the formula

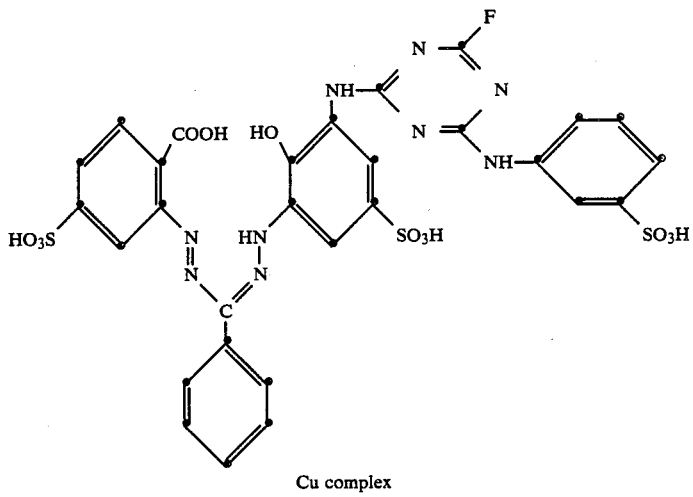

Cu complex is salted out by adding sodium chloride and potassium chloride and is isolated and dried. Cotton and staple rayon can be dyed or printed with the dye in blue shades which are fast to light and washing.

The chromophores listed in Table 1 below can be reacted by the same procedure by reacting equivalent parts of an amine in column 3 in accordance with the instructions of the preceding example with corresponding parts of 2,4,6-trifluorotriazine and then carrying out the condensation reaction with equivalent parts of the amino dye in column 2.

TABLE 1

| No. | Amino dye | Amine | Colour shade on cotton |
|---|---|---|---|
| 2 | N—(2-carboxy-5-sulfophenyl)-N'—(2'-hydroxy-3'-amino-5'-sulfophenyl)-ms-phenylformazan (Cu) | 1-amino-3($\beta$-sulfatoethylsulfonyll)-benzene | blue |
| 3 | N—(2-carboxy-5-sulfophenyl)-N'—(2'-hydroxy-3'-amino-5'-sulfophenyl)-ms-phenylformazan (Cu) | 1-amino-4-($\beta$-sulfatoethylsulfonyl)-benzene | blue |
| 4 | N—(2-carboxy-5-sulfophenyl)-N'—(2'-hydroxy-3'-amino-5'-sulfophenyl)-ms-phenylformazan (Cu) | 1-aminobenzene-4-sulfonic acid | blue |
| 5 | N—(2-carboxy-5-sulfophenyl)-N'—(2'-hydroxy-3'-amino-5'-sulfophenyl)-ms-phenylformazan (Cu) | 2-aminonaphthalene-4,8-disulfonic acid | blue |
| 6 | N—(2-carboxy-5-sulfophenyl)-N'—(2'hydroxy-3'-amino-5'-sulfophenyl)-ms-(2''-sulfophenyl)-formazan (Cu) | 1-aminobenzene-3-sulfonic acid | blue |
| 7 | N—(2-carboxy-5-sulfophenyl)-N'—(2'-hydroxy-3'-amino-5'-sulfophenyl)-ms-(2''-sulfophenyl)-formazan (Cu) | 1-aminobenzene-2,5-disulfonic acid | blue |
| 8 | N—(2-carboxy-5-sulfophenyl)-N'—(2'-hydroxy-3'-amino-5'-sulfophenyl)-ms-(2''-sulfophenyl)-formazan (Cu) | 2-aminonaphthalene-4,8-disulfonic acid | blue |
| 9 | N—(2-carboxy-5-sulfophenyl)-N'—(2'-hydroxy-3'-amino-5'-sulfophenyl)-ms-(2''-sulfophenyl)-formazan (Cu) | 1-amino-3-($\beta$-sulfatoethylsulfonyl)-benzene | blue |
| 10 | N—(2-carboxy-5-sulfophenyl)-N'—(2'-hydroxy-3'-aminophenyl)-ms-(''-sulfophenyl)-formazan (Cu) | 1-aminobenzene-3-sulfonic acid | blue |
| 11 | N—(2-carboxy-5-sulfophenyl)-N'—(2'-hydroxy-3'-aminophenyl)-ms-(''-sulfophenyl)-formazan (Cu) | 1-aminobenzene-2,5-disulfonic acid | blue |
| 12 | N—(2-carboxy-5-sulfophenyl)-N'—(2'-hydroxy-3'-aminophenyl)-ms-(''-sulfophenyl)-formazan (Cu) | 2-aminonaphthalene-4,6,8,-trisulfonic acid | blue |
| 13 | N—(2-carboxy-4-sulfophenyl)-N'—(2'-hydroxy-3'-amino-5'-sulfophenyl)-mx-phenylformazan (su) | 1-aminobenzene-3-sulfonic acid | blue |
| 14 | N—(2-carboxy-4-sulfophenyl)-N'—(2'-hydroxy-3'-amino-5'-sulfophenyl)-mx-phenylformazan (su) | 1-aminobenzene-2,5-disulfonic acid | blue |
| 15 | N—(2-carboxy-4-sulfophenyl)-N'—(2'-hydroxy-3'-amino-5'-sulfophenyl)-mx-phenylformazan (su) | 1-amino-3-($\beta$-sulfatoethylsulfonyl)-benzene | blue |

TABLE 1-continued

| No. | Amino dye | Amine | Colour shade on cotton |
|---|---|---|---|
| 16 | N—(2-carboxy-4-sulfophenyl)-N'—(2'-hydroxy-3'-amino-5'-sulfophenyl)-mx-phenylformazan (su) | 2-aminonaphthalene-4,8-disulfonic acid | blue |
| 17 | N—(2-carboxy-4-sulfophenyl)-N'—(2'-hydroxy-3'-amino-5'-sulfophenyl)-ms-phenylformazan (Cu) | 2-aminonaphthalene-4,6,8-trisulfonic acid | blue |
| 18 | N—(2-carboxy-4-sulfophenyl)-N'—(2'-hydroxy-3'-amino-5'-sulfophenyl)-ms-(3''-sulfophenyl)-formazan (Cu) | 1-aminobenzene-3-sulfonic acid | blue |
| 19 | N—(2-carboxy-4-sulfophenyl)-N'—(2'-hydroxy-3'-amino-5'-sulfophenyl)-ms-(3''-sulfophenyl)-formazan (Cu) | 1-aminobenzene-4-sulfonic acid | blue |
| 20 | N—(2-carboxy-4-sulfophenyl)-N'—(2'-hydroxy-3'-amino-5'-sulfophenyl)-ms-(3''-sulfophenyl)-formazan (Cu) | 1-amino-4-($\beta$-sulfatoethylsulfonyl)-benzene | blue |
| 21 | N—(2-carboxy-4-sulfophenyl)-N'—(2'-hydroxy-3'-amino-5'-sulfophenyl)-ms-(3''-sulfophenyl)-formazan (Cu) | 2-aminonaphthalene-4,8-disulfonic acid | blue |
| 22 | N—(2-carboxy-4-sulfophenyl)-N'—(2'-hydroxy-3'-amino-5'-sulfophenyl)-ms-(2''-chloro-5''-sulfophenyl)-formazan (Cu) | 1-aminobenzene-3-sulfonic acid | blue |
| 23 | N—(2-carboxy-4-sulfophenyl)-N'—(2'-hydroxy-3'-amino-5'-sulfophenyl)-ms-(2''-chloro-5'' -sulfophenyl)-formazan (Cu) | 2-aminonaphthalene-5,7-disulfonic acid | blue |
| 24 | N—(2-carboxy-4-aminophenyl)-N'—(2'-hydroxy-3',5'-disulfophenyl)-ms-phenylformazan (Cu) | 1-aminobenzene-3-sulfonic acid | blue |
| 25 | N—(2-carboxy-4-aminophenyl)-N'—(2'hydroxy-3',5'-disulfophenyl)-ms-phenylformazan (Cu) | 1-amino-3-($\beta$-sulfatoethylsulfonyl)-benzene | blue |
| 26 | N—(2-carboxy-4-aminophenyl)-N'—(2'hydroxy-3',5'-disulfophenyl)-ms-phenylformazan (Cu) | 1-amino-4-($\beta$-sulfatoethylsulfonyl)-benzene | blue |
| 27 | N—(2-carboxy-4-aminophenyl)-N'—(2'hydroxy-3',5'-disulfophenyl)-ms-phenylformazan (Cu) | 2-aminonaphthalene-5-sulfonic acid | blue |
| 28 | N—(2-carboxy-4-aminophenyl)-N'—(2'hydroxy-3',5'-disulfophenyl)-ms-phenylformazan (Cu) | 2-aminonaphthalene-4,8-disulfonic acid | blue |
| 29 | N—(2-carboxy-4-aminophenyl)-N'—(2'-hydroxy-3',5'-disulfophenyl)-ms-(2''-sulfophenyl)-formazan (Cu) | 1-aminobenzene-3-sulfonic acid | blue |
| 30 | N—(2-carboxy-4-aminophenyl)-N'—(2'hydroxy-3',5'-disulfophenyl)-ms-(2''-sulfophenyl)-formazan (Cu) | 1-amino-3-($\beta$-sulfatoethylsulfonyl)-benzene | blue |
| 31 | N—(2-carboxy-4-aminophenyl)-N'—(2'hydroxy-3',5'-disulfophenyl)-ms-(2''-sulfophenyl)-formazan (Cu) | 1-amino-4-($\beta$-sulfatoethylsulfonyl)-benzene | blue |
| 32 | N—(2-carboxy-4-aminophenyl)-N'—(2'hydroxy-3',5'-disulfophenyl)-ms-(2''-sulfophenyl)-formazan (Cu) | 1-aminobenzene-2,5-disulfonic acid | blue |
| 33 | N—(2-carboxy-4-aminophenyl)-N'—(2'hydroxy-3',5'-disulfophenyl)-ms-(2''-sulfophenyl)-formazan (Cu) | 2-aminonaphthalene-6-sulfonic acid | blue |
| 34 | N—(2-carboxy-4-aminophenyl)-N'—(2'hydroxy-3',5'-disulfophenyl)-ms-(2''-sulfophenyl)-formazan (Cu) | 2-aminonaphthalene-4,8-disulfonic acid | blue |
| 35 | N—(2-carboxy-4-aminophenyl)-N'—(2' -hydroxy-3',5'-disulfophenyl)-ms-(3''-sulfophenyl)-formazan (Cu) | 1-aminobenzene-4-sulfonic acid | blue |
| 36 | N—(2-carboxy-4-aminophenyl)-N'—(2'hydroxy-3',5'-disulfophenyl)-ms-(3''-sulfophenyl) formazan (Cu) | 1-aminobenzene-3-sulfonic acid | blue |
| 37 | N—(2-carboxy-4-aminophenyl)-N'—(2'hydroxy-3',5'-disulfophenyl)-ms-(3''-sulfophenyl) formazan (Cu) | 2-aminonaphthalene-4,8-disulfonic acid | blue |
| 38 | N—(2-carboxy-4-aminophenyl)-N'—(2'-hydroxy-3',5'-disulfophenyl)-ms-(4''-sulfophenyl)-formazan (Cu) | 1-aminobenzene-3-sulfonic acid | blue |
| 39 | N—(2-carboxy-4-aminophenyl)-N'—(2'hydroxy-3',5'-disulfophenyl)-ms-(4''-sulfophenyl formazan (Cu) | 1-amino-3-($\beta$-sulfatoethylsulfonyl)-benzene | blue |
| 40 | N—(2-carboxy-4-aminophenyl)-N'—(2'hydroxy-3',5'-disulfophenyl)-ms-(4''-sulfophenyl formazan (Cu) | 1-amino-4-($\beta$-sulfatoethylsulfonyl)-benzene | blue |
| 41 | N—(2-carboxy-4-aminophenyl)-N'—(2'hydroxy-3',5'-disulfophenyl)-ms-(4''-sulfophenyl formazan (Cu) | 1-aminobenzene-2,5-disulfonic acid | blue |
| 42 | N—(2-carboxy-4-aminophenyl)-N'—(2'hydroxy- | 2-aminonaphthalene-5-sulfonic acid | blue |

TABLE 1-continued

| No. | Amino dye | Amine | Colour shade on cotton |
|---|---|---|---|
| | 3',5'-disulfophenyl)-ms-(4"-sulfophenyl formazan (Cu) | | |
| 43 | N—(2-carboxy-4-aminophenyl)-N'—(2'hydroxy-3',5'-disulfophenyl)-ms-(4"-sulfophenyl formazan (Cu) | 2-aminonaphthalene-4,8-disulfonic acid | blue |
| 44 | N—(2-carboxy-4-aminophenyl)-N'—(2'-hydroxy-3',5'-disulfophenyl)-ms-(2",4"-sulfophenyl)-formazan (Cu) | 1-aminobenzene-4-sulfonic acid | blue |
| 45 | N—(2-carboxy-4-aminophenyl)-N'—(2'hydroxy-3',5'-disulfophenyl)-ms-(2",4"-sulfophenyl formazan (Cu) | 1-aminobenzene-3-sulfonic acid | blue |
| 46 | N—(2-carboxy-4-aminophenyl)-N'—(2'hydroxy-3',5'-disulfophenyl)-ms-(2",4"-sulfophenyl formazan (Cu) | 1-amino-4-($\beta$-sulfatoethylsulfonyl)-benzene | blue |
| 47 | N—(2-carboxy-4-aminophenyl)-N'—(2'hydroxy-3',5'-disulfophenyl)-ms-(2",4"-sulfophenyl formazan (Cu) | 2-aminonaphthalene-6-sulfonic acid | blue |
| 48 | N—(2-carboxy-4-aminophenyl)-N'—(2'hydroxy-3',5'-disulfophenyl)-ms-(2",4"-sulfophenyl formazan (Cu) | 2-aminonaphthalene-8-sulfonic acid | blue |
| 49 | N—(2-carboxy-4-sulfophenyl)-N'—(2'-hydroxy-5'-amino-3'-sulfophenyl)-ms-phenylformazan (Cu) | 1-aminobenzene-3-sulfonic acid | blue |
| 50 | N—(2-carboxy-4-sulfophenyl)-N'—(2'-hydroxy-5'-amino-3'-sulfophenyl-ms-phenylformazan (Cu) | 1-amino-3-($\beta$-sulfatoethylsulfonyl)-benzene | blue |
| 51 | N—(2-carboxy-4-sulfophenyl)-N'—(2'-hydroxy-5'-amino-3'-sulfophenyl)-ms-phenylformazan (Cu) | 1-aminobenzene-2,4-disulfonic acid | blue |
| 52 | N—(2-carboxy-4-sulfophenyl)-N'—(2'-hydroxy-5'-amino-3'-sulfophenyl)-ms-phenylformazan (Cu) | 2-aminonaphthalene-4,8-disulfonic acid | blue |
| 53 | N—(2-carboxy-4-sulfophenyl)-N'—(2'-hydroxy-5'-amino-3'-sulfophenyl)-ms-(2"-sulfophenyl)-formazan (Cu) | 1-aminobenzene-3-sulfonic acid | blue |
| 54 | N—(2-carboxy-4-sulfophenyl-N'—(2'-hydroxy-5'-amino-3'-sulfophenyl)-ms-(2"-sulfophenyl)-formazan (Cu) | 2-aminonaphthalene-4,8-disulfonic acid | blue |
| 55 | N—(2-carboxy-4-sulfophenyl)-N'—(2'-hydroxy-5'-amino-3'-sulfophenyl)-ms-(4"-sulfophenyl)-formazan (Cu) | 1-aminobenzene-3-sulfonic acid | blue |
| 56 | N—(2-carboxy-5-sulfophenyl)-N'—(2'-hydroxy-3',5'-disulfophenyl)-ms-(3"-aminophenyl)-formazan (Cu) | 1-aminobenzene-3-sulfonic acid | blue |
| 57 | N—(2-hydroxy-5-amino-3-sulfophenyl)-N'—(2',5-disulfophenyl)-ms-phenylformazan (Cu) | 1-aminobenzene-3-sulfonic acid | blue |
| 58 | N—(2-hydroxy-3-amino-5-sulfophenyl)-N'—(2'-hydroxy-4'-sulfophenyl)-ms-(2"-sulfophenyl)-formazan (Cu) | 1-aminobenzene-3-sulfonic acid | blue |
| 59 | N—(2-hydroxy-5-sulfophenyl)-N'—(2'-hydroxy-3',5'-disulfophenyl)-ms-(4"-aminophenyl)-formazan (Cu) | 1-aminobenzene-3-sulfonic acid | blue |
| 60 | 1-amino-3-acetylaminobenzene-6'-sulfonic acid →1-amino-8-hydroxy-2-(4'-sulfophenyl-azo)-naphthahlene-3,6-disulfonic acid (sic) (saponified) | 1-aminobenzene-3-sulfonic acid | blue |
| 61 | 1-amino-3-acetylaminobenzene-6'-sulfonic acid→1-amino-8-hydroxy-2-(4'-sulfophenylazo)-naphthalene-3,6-disulfonic acid (saponified) | 1-amino-3-($\beta$-sulfatoethylsulfonyl)-benzene | blue |
| 62 | 1-amino-3-acetylaminobenzene-6'-sulfonic acid →1-amino-8-hydroxy-2-(4'-sulfophenylazo)-naphthalene-3,6-disulfonic acid (saponified) | 1-amino-4-($\beta$-sulfatoethylsulfonyl)-benzene | blue |
| 63 | 1-amino-3-acetylaminobenzene-6'-sulfonic acid →1-amino-8-hydroxy-2-(4'-sulfophenylazo)-naphthalene-3,6-disulfonic acid (saponified) | 2-aminonaphthalene-4,8-disulfonic acid | blue |
| 64 | 1-amino-3-acetylaminobenzene-6'-sulfonic acid→1-amino-8-hydroxy-2-(2',5'-disulfophenylazo)-naphthalene-3,6-disulfonic acid (saponified) | 1-aminobenzene-3-sulfonic acid | blue |
| 65 | 1-amino-3-acetylaminobenzene-6'-sulfonic acid →1-amino-8-hydroxy-2-(2',5'-disulfophenylazo)-naphthalene-3,6-disulfonic acid (saponified) | 1-amino-4-($\beta$-sulfatoethylsulfonyl)-benzene | blue |
| 66 | 1-amino-2-hydroxy-6-nitronaphthalene-4-sulfonic acid→1-amino-8-hydroxy-naphthalene-2,4-disulfonic acid (reduced) (Cu) | 1-aminobenzene-3-sulfonic acid | blue |

TABLE 1-continued

| No. | Amino dye | Amine | Colour shade on cotton |
|-----|-----------|-------|------------------------|
| 67 | 1-amino-3-acetylaminobenzene-6-sulfonic acid→1-benzoylamino-8-hydroxy-naphthalene-3,6-disulfonic acid (Acetyl-amino group saponified) | 1-aminobenzene-3-sulfonic acid | red |
| 68 | 1-amino-3-acetylaminobenzene-6-sulfonic acid→1-ethyl-3-aminocarbonyl-4-methyl-6-hydroxy-2-pyridone(saponified) | 1-aminobenzene-3-sulfonic acid | yellow |

EXAMPLE 69

23.8 g of the Cu complex of N-(2-carboxy-5-sulfophenyl)-N'-(2'-hydroxy-3'-amino-5'-sulfophenyl)-ms-phenylformazan are dissolved in 250 ml of water, whereby a pH of 5.3 results. 8.6 g of 1-aminobenzene-3-sulfonic acid are introduced into this solution (the pH falls to 3.5), followed by 4.3 g of sodium fluoride (the pH rises again to 5.3). The reaction solution is cooled to 0° C. and the pH is adjusted to a value of 4.9 with a little 2N hydrochloric acid. 6.8 g of 2,4,6-trifluorotriazine are added dropwise, with good stirring, in the course of 3 minutes. After 5 minutes the pH of the reaction solution is slowly adjusted to a value of 7.5 with 2N sodium hydroxide solution at 0° to 5° C. The temperature is then allowed to rise gradually to 20° C. in order to complete the reaction with the dye chromophore. The dye of the formula

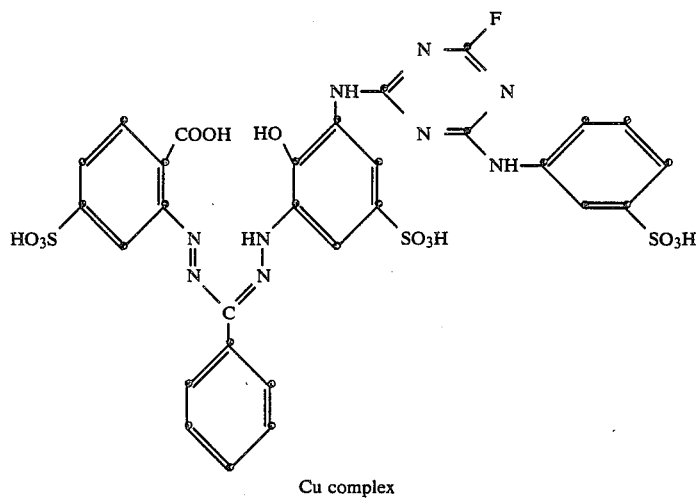

Cu complex is salted out with sodium chloride and potassium chloride and is isolated and dried. It dyes cotton from a long liquor in blue shades fast to light and wet processing.

What is claimed is:

1. In a process for the preparation of a reactive dye of the formula

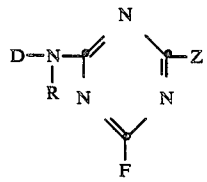

in which D is a formazan, dye containing a sulfo group, R is hydrogen or $C_1$–$C_4$-alkyl unsubstituted or substituted by halogen, hydroxyl, cyano, $C_{1-4}$-alkoxy, methoxycarbonyl, ethoxycarbonyl, aminosulfonyl, carboxyl, suflo or sulfato; and Z is —$NH_2$, alkylamino, N,N-dialkylamino, cyclohexylamino, N,N-dicyclohexylamino, benzylamino, phenethylamino, phenylamino, naphthylamino, N-alkyl-N-cyclohexylamino, N-alkyl-N-phenylamino, N-alkyl-N-naphthylamino, furanyl-, thiophenyl-, pyrazolyl-, pyridinyl-, pyrimidinyl-, quinolinyl-, benzimidazolyl-, benzthiazolyl- or benzoxazolylamino, morpholino, piperidino or piperazino, the alkyl, cyclohexyl, phenyl, naphthyl or heterocyclic radicals being unsubstituted or substituted by halogen, nitro, cyano, trifluoromethyl, sulfamoyl, carbamoyl, $C_{1-4}$-alkyl, $C_{1-4}$-alkoxy acetylamino, benzoylamino, ureido, hydroxyl, carboxyl, sulfomethyl, sulfato, sulfatoethylsufonyl, vinylsulfonyl or sulfo; comprising the steps of condensing 2,4,6-trifluoro-s-triazine with an amino dye of the formula D—NH—R and an amine of the formula H—Z, the improvement comprising condensing 2,4,6-trifluoro-s-triazine with the amine of the formula H—Z in a strongly acid solution and in the presence of an alkali metal fluoride, and then condensing the resulting primary condensation product of the formula

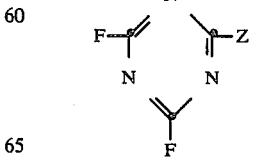

with the amino dye of the formula D—NH—R to give the reactive dye.

2. A process according to claim 1, wherein the reactions are carried out in aqueous mixtures.

3. A process according to claim 2, wherein the reactions are carried out at low temperatures.

4. A process according to claim 1, wherein the alkali metal fluoride used is NaF.

5. A process according to claim 1, wherein the amine of formula H—Z is aminobenzene unsubstituted or substituted by methyl, methoxy, chloro, carboxy, sulfo, sulfatoethylsulfonyl or vinylsulfonyl.

6. A process according to claim 1, wherein the amino dye of the formula (2) used is a formazan copper complex dye.

7. A process according to claim 6, for the preparation of a reactive dye of the formula

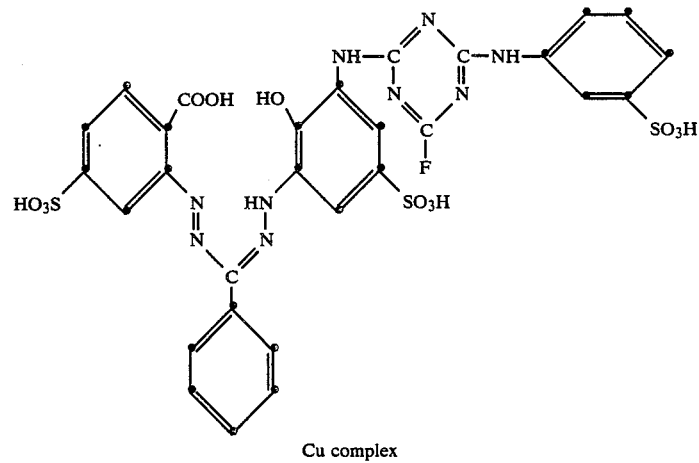

Cu complex

* * * * *